July 7, 1964  J. J. FANNON, JR  3,139,881
INFRARED CHICKEN BROODER
Filed May 29, 1962  3 Sheets-Sheet 1

INVENTOR
JOHN J. FANNON, JR.

BY Strauch, Nolan & Neale
ATTORNEYS
P-52

July 7, 1964   J. J. FANNON, JR   3,139,881
INFRARED CHICKEN BROODER
Filed May 29, 1962   3 Sheets-Sheet 2

INVENTOR
JOHN J. FANNON, JR.

BY Strauch, Nolan & Neale
ATTORNEYS

July 7, 1964 J. J. FANNON, JR 3,139,881
INFRARED CHICKEN BROODER

Filed May 29, 1962 3 Sheets-Sheet 3

INVENTOR
JOHN J. FANNON, JR.

BY Strauch, Nolan + Neale
ATTORNEYS
R-52

United States Patent Office 3,139,881
Patented July 7, 1964

3,139,881
INFRARED CHICKEN BROODER
John J. Fannon, Jr., Grosse Pointe Park, Mich., assignor to Hupp Corporation, Cleveland, Ohio, a corporation of Virginia
Filed May 29, 1962, Ser. No. 198,594
7 Claims. (Cl. 126—92)

This invention relates to heaters and, more specifically, to gas-fired infrared heaters for brooder houses and similar structures and to methods for heating brooder houses and the like and for operating infrared heaters.

The conventional brooder house heater, commonly termed a hover, consists of a canopy of substantial area with a centrally disposed burner beneath it. The air beneath the canopy is heated by the burner providing a warm area for the chicks. In addition, small amounts of heat are radiated onto the chicks from the canopy. A typical hover is illustrated in United States Patent No. 3,027,888, issued to H. D. Du Fault et al. on April 3, 1962, for "Poultry Brooders."

Hovers are bulky, difficult to service and clean, and their canopies may become sufficiently hot to burn chicks which jump or fly against it. In addition, the brooder house area not covered by the canopy is wasted since it is too cool for the chicks. The wasted area is necessarily substantial since sufficient room must be left for the poultry raiser to move around the canopy as he tends the chicks.

It has long been felt desirable to provide the required heat by a radiant heater above the floor and away from the chicks to eliminate the problems associated with hovers. By using a radiant heater the canopy employed in the hover may be eliminated and the entire floor area of the brooder house warmed. In addition, heat losses can be reduced since the brooder house walls need not be heated as warm as the hover canopies. Elimination of the canopy also facilitates feeding and watering the chicks and makes it possible to keep the chicks under observation without disturbing them.

In addition to the foregoing benefits, a more healthful atmosphere may be provided since radiant heaters allow an increased quantity of ventilating air to be circulated without chilling the chicks; and because the hot, moisture-laden blanket of stale air which the hover canopy held near the brooder house floor is eliminated. Increased air circulation and elimination of the hover canopy in turn eliminates brooder odors, reduces the humidity, and eliminates the chick diseases which resulted from these conditions. It has been found that the chicks thrive and are comfortable in ambient temperatures as low as 60° F., and one brood of chicks was successfully started and raised in a brooder house heated by a gas-fired radiant heater where the ambient temperature never exceeded 43° F.

Both electric and gas-fired infrared brooder house heaters have heretofore been proposed. Electrical infrared heaters are generally lower in initial cost than gas-fired heaters but are more expensive to operate.

The prior art gas-fired infrared brooder heaters have also proven impractical. In a brooder house substantial quantities of feathers, chick down, litter and other debris are present as small airborne particles. This debris has tended to block off the air supply to the prior art heaters to such an extent that the heaters would not operate properly. This difficulty has been encountered with both the main and pilot burners. Difficulty has also been experienced in keeping the pilot burner lit due to its extinguishment by natural drafts and by ventilating air circulated at substantial velocity by fans or blowers.

It is therefore a primary object of the present invention to provide a gas-fired radiant heater for brooder houses and like structures which may be suspended several feet above the structure floor and which is constructed to prevent interference with combustion by natural drafts, circulated ventilating air, or by debris floating in the air.

It is especially important to maintain a continuous flow of primary combustion air to the burner of an infrared heater since such heaters use only primary combustion air.

It is therefore a further object of the present invention to provide a radiant heater having a combustion air inlet filter which will invariably provide a free flow of induced primary air to the burner.

It is another object of the present invention to provide a radiant heater having a combined pilot burner shield, air distributor, and filter which will prevent extinguishment of the pilot flame by drafts, circulating ventilating air, or debris floating in the surrounding atmosphere.

In conjunction with the foregoing object, it is another object of the present invention to provide a thermostatic safety shut-off responsive to the pilot burner flame which will shut off the gas supply to the main burner if the pilot flame goes out.

Another requirement of a brooder house heater is that it automatically supply the requisite amount of heat to maintain the brooder house at the desired temperature. The conventional control employed for this purpose includes a valve in the burner gas supply line and a thermostat disposed at the location where the temperature is to be controlled and connected to the actuator of the valve. Since, in a brooder house, the location of the thermostat is generally near the floor, it and the connections between it and the gas valve are exposed to damage.

It is therefore a further object of the present invention to provide a gas-fired radiant heater for brooder houses and the like which has a thermostatic gas control with the thermal element incorporated into the heater and operated by the absorption of radiant heat from the brooder house floor together with heat radiated from the bodies of the chicks and air currents in the brooder house.

In the preferred embodiment of the present invention, the thermostatic element is fixed adjacent the lowermost components of the radiant heater. So arranged, the thermostatic element will respond to both radiant energy and convection currents to maintain the proper brooder house temperature whether the chicks are congregated in a mass or whether they are spread over the entire brooder house floor.

The present invention further provides means for suspending the radiant heater from the brooder house ceiling, eliminating the need for legs or other structure resting on the floor. In the preferred embodiment, gas is supplied to the radiant heater burner through a flexible hose so that the height of the heater may be varied as desired.

The heater is preferably suspended with the radiant surface of the burner at an angle to the floor so that the thermostatic element and the combustion air inlet are below the radiant surface. This facilitates proper venting of combustion products and prevents them from impinging on the thermostatic element or recirculating through the combustion air inlet.

Further objects of the present invention include the provision of a radiant heater for brooder houses and the like which is light, compact, and easily handled, which requires only a small shipping or storage space, which can be delivered assembled for use, which can be installed at a nominal cost, which is economical to manufacture and service, and which is adaptable to mass production techniques.

It is another object of the present invention to provide novel methods of heating brooder houses and the like.

Yet another object of the present invention is the provision of novel methods of operating infrared heaters.

Further objects and other novel features of the present invention will be apparent from the appended claims and from the ensuing detailed description and discussion taken in conjunction with the accompanying drawings, in which:

Figure 1:
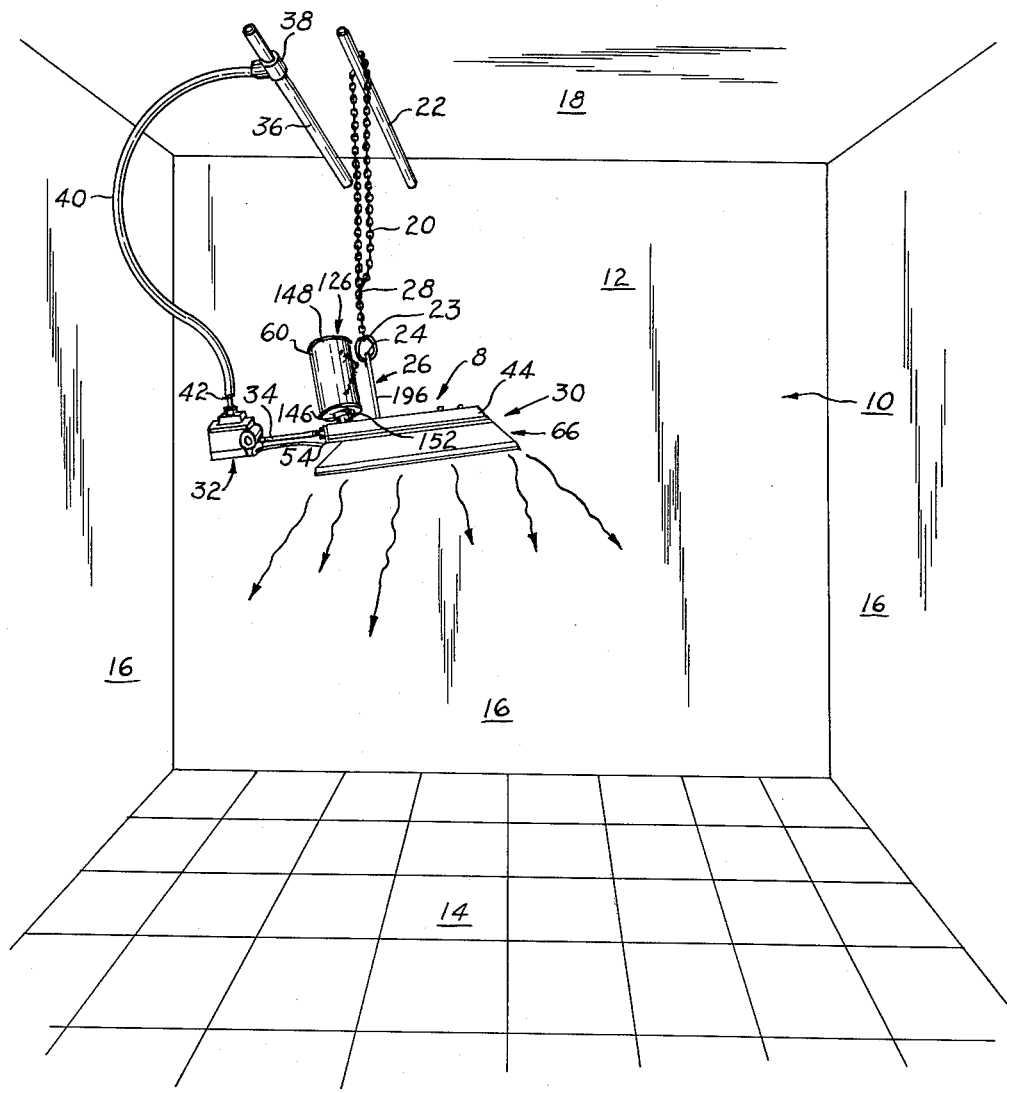
FIGURE 1 is a perspective view of the interior of a brooder house with the novel radiant heater of the present invention installed therein.

Referring now to the drawings, FIGURE 1 shows the novel infrared heater 8 of the present invention installed in a brooder house 10 which has an interior 12 defined by a floor 14, side walls 16, and a ceiling 18. Heater 8 is suspended by a chain 20 from a pipe 22 fixed in opposed brooder house side walls 16 adjacent ceiling 18. One end of chain 20 has a ring 23 hooked in a loop 24 formed at the upper end of a hanger 26 which is secured to the heater.

Chain 20 is passed over support pipe 22 and a hook 28 formed on the free end of the chain is engaged in one of its links. By fastening hook 28 in different links, the height of infrared heater 8 above brooder house floor 14 may be varied to suit the age of the chicks and other conditions effecting the required area of heat distribution and the rate of heat supply.

Heater 8 includes a gas-fired infrared burner 30 and a control unit 32 connected by a rigid gas pipe 34 which supplies gas from the control unit to the burner.

Combustible gas is supplied to control unit 32 from a gas supply pipe 36 through a T fitting 38 incorporated in the gas supply pipe above infrared heater 8. T 38 is connected to a flexible hose 40 which is attached, at its opposite end, to the inlet 42 of control unit 32. Flexible hose 40 is preferably sufficiently long to allow heater 8 to be raised adjacent ceiling 18 and lowered to a position slightly above floor 14.

Any suitable gas-fired infrared burner may be employed in heater 8. The preferred type is that having a lower radiant surface heated by the combustion of gas mixed with 100% primary air inducted into the burner by the gas flow. Burners of this type are disclosed in United States Patent No. 2,775,294 issued to G. Schwank, December 25, 1956, for "Radiation Burners."

Figure 3:
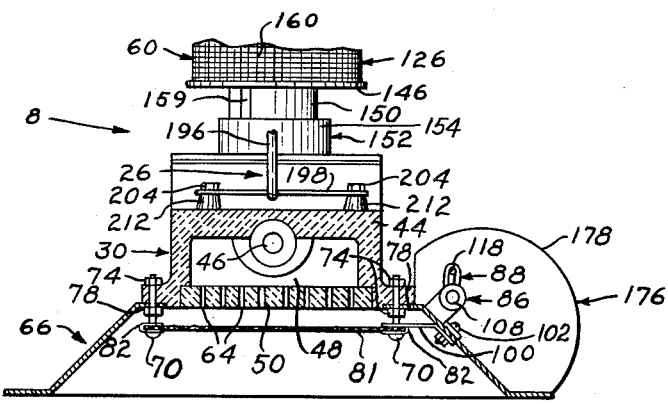
FIGURE 3 is a transverse section through the burner, taken substantially along the line 3—3 of FIGURE 2.
Figure 4:
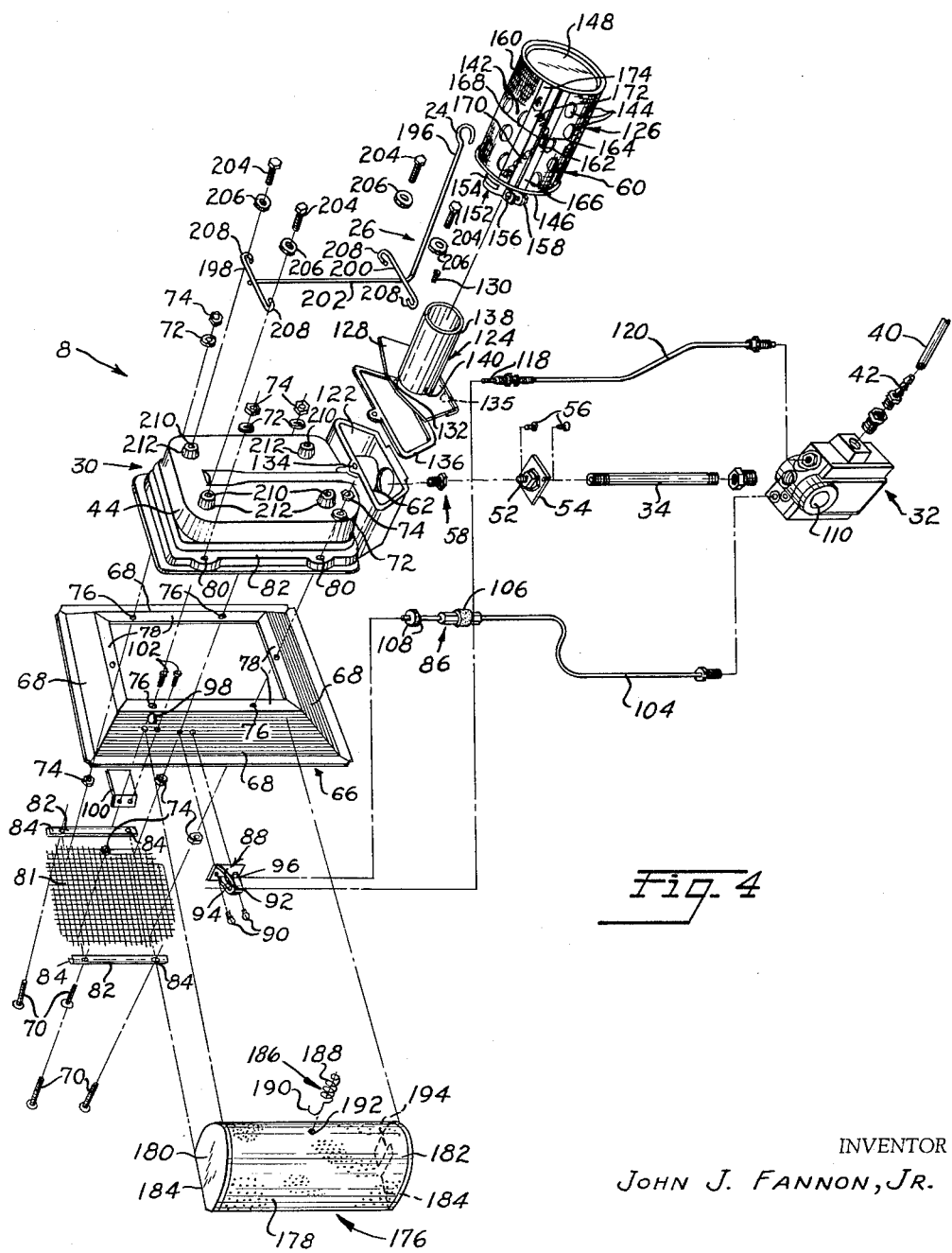
FIGURE 4 is an exploded view of the heater, showing the structure and relation of its component parts.

The burner 30 illustrated in FIGURES 3 and 4, which is of the type disclosed in the Schwank patent, includes a burner casting 44 providing a venturi section 46 and a mixing chamber 48, and a perforated ceramic plate 50 which provides a radiant surface on the underside of heater 8 directing the radiant energy in a generally downward direction as indicated by the wavy arrows in FIGURE 1. Gas flowing to burner 30 from gas supply line 36 through flexible hose 40, control unit 32 and gas supply pipe 34 enters venturi section 46 of burner casting 44 through a pipe coupling 52 (see FIGURE 4) fixed to a square plate 54 which is attached to one end of burner casting 44 by two screws 56. An orifice spud 58 screwed onto pipe coupling 52 controls the maximum gas flow to the burner.

The flow of gas through venturi section 46, which communicates with mixing chamber 48, induces a flow of air into the mixing chamber through a combustion air filter 60 and a combustion air passage 62 in burner casting 44, only a portion of which is shown (see FIGURE 4). The gas and combustion air are mixed in mixing chamber 48 and the mixture is forced through perforations 64 in ceramic plate 50 and burned on the lower side of ceramic plate 50 which is thereby heated to incandescence. The radiant energy emitted by incandescent ceramic plate 50 is, as was discussed above, directed downwardly to warm the chicks on floor 14 of brooder house 10.

To further direct the radiant energy, a reflector 66 fabricated from four trapezoidal strips of aluminum 68 connected as by brazing (see FIGURE 4) is employed. Reflector 66 is attached to the lower edge of burner casting 44 by four bolts 70 provided with washers 72 and nuts 74. Bolts 70 extend through apertures 76 in horizontal flanges 78 of the reflector and apertures 80 in the burner casting.

A heat-resistant wire screen 81 is supported about one-fourth inch below ceramic plate 50 by two U-shaped heat resistant strips 82 having apertures 84 through which the bolts 70 described above, pass. Screen 81, which is preferably of about one-fourth inch mesh, protects the flame adjacent ceramic plate 50 from disturbance by air currents and, in addition, provides a reradiating surface, increasing the amount of heat radiated by burner 30.

A pilot burner 86 is attached to the exterior of one of the reflector strips 68 by a clamp 88 secured to the reflector strip by screws 90. Clamp 88 may be of any suitable construction which will permit the ready removal of pilot burner 86. In the illustrated embodiment, it is fabricated from a pair of cooperating members 92 and 94 secured together by a screw 96.

An aperture 98 in reflector strip 68 below pilot burner 86 permits the pilot flame to pass through reflector strip 68 to ceramic plate 50 where it ignites the air-gas mixture issuing through perforations 64.

A rectangular baffle 100 of heat resistant metal is attached by screws 102 to the interior surface of reflector strip 68 below pilot burner 86 to protect the pilot flame from extinguishment by air currents and to deflect it against the lower face of ceramic plate 50.

Pilot burner 86 may be any commercially available pilot burner of the Bunsen type. One pilot burner suitable for use in the present invention is the "Mini-Pilot," manufactured by the Robertshaw Fulton Controls Company.

Gas is supplied to pilot burner 86 from control unit 32 through a pilot burner supply line 104. Air enters the pilot burner through an aperture (not shown) surrounded by a fine screen 106 which prevents debris floating in the air from interfering with the operation of the pilot burner. The pilot flame issues from the pilot burner between two cylindrical discs 108. Since the pilot burner 86, by itself, forms no part of the present invention and since it is a commercially available component, it is not believed that further elaboration of its details is required herein.

Control unit 32 is of the conventional non-electric type having a manual valve, a thermostatic valve actuated by a temperature sensing element responsive to the temperature of the heated space, and a safety valve operated by a temperature sensing element positioned adjacent the pilot flame to shut off the gas supply to the main and pilot burners if the pilot flame goes out. Control unit 32 which by itself forms no part of the present invention, may be of any standard, commercially available construction. Examples of suitable controls are shown in United States Patent No. 2,607,529, issued August 19, 1952, to R. F. Garner for "Combined Thermostat and Automatic Pilot Control," and in United States Patent No. 2,627,911, issued to L. V. McCarty et al. on February 10, 1953, for "Fuel Control Device."

In the illustrated exemplary control, the manual valve (not shown) is controlled by a knob 110. The thermostatic valve (likewise not shown) is controlled by a fluid-filled temperature sensing bulb 112 connected to the valve actuator by a tube 114. The temperature at which it is desired brooder house 10 be maintained may be varied by rotating a knob 116. The safety valve (not shown) of the exemplary illustrated control unit 32 is held open by an electromagnet (also not shown).

The energizing current for the electromagnet is generated by a thermocouple 118 fixed by the clamp 88 described above to reflector 66 adjacent the discs 108 of pilot burner 86 from between which the pilot flame issues. A coaxial cable 120 connects thermocouple 118 to the electromagnet in control unit 32.

It is not necessary that an electromagnetically actuated pilot safety valve be employed. Alternatively, the type of safety pilot may be employed in which a thermal bulb is disposed in heat transfer relationship to the pilot burner flame and the safety valve is opened by the pressure of a fluid disposed within the thermal bulb and heated by the pilot flame.

To light burner unit 32, knob 110 of control unit 32 is moved to the "pilot" position, allowing gas to flow to pilot burner 86 only. The pilot burner may then be lit as with a match. The heat generated by the pilot burner 86, impinging upon thermocouple 118, generates a current to energize the electromagnet and open the safety valve. Subsequent movement of control knob 110 to the "on" position continues the gas supply to pilot burner 86 and, if the temperature within brooder house 10 is below the temperature set by knob 116, to main burner 30.

The illustrated embodiment of control unit 32 is provided with an off-on type of thermostatic valve. Thus, temperature sensing element 112 will effect opening and closing of the thermostatic valve to turn main burner 30 off and on as required to maintain the desired temperature in brooder house 10. Alternatively, a modulating type of thermostatic valve may be employed. In this case, the flow of gas to main burner 30 will be varied as the conditions effecting the temperature in brooder house 10 vary to maintain the desired brooder house temperature.

If the pilot flame goes out, thermocouple 118 will cool and cease to generate a voltage, deenergizing the electromagnet (not shown) and closing the safety valve. This will cut off the flow of gas to pilot burner 86 and main burner 30, preventing an accumulation of gas in brooder house 10. Burner operation may be restored by repeating the lighting cycle described above.

As was pointed out above, one of the novel and important features of the present invention is air filter 60 which prevents the interior of burner 30 from being obstructed by feathers, dust, chick down, or other foreign matter floating in the air. The design of filter 60 is of special significance since burner 30 is of the infrared type and all of the combustion air supplied to it is primary air inducted into the burner by the flow of combustion gas through venturi section 46 of burner casting 44. Because of this, the filter must not only prevent the entrance of foreign matter into the burner's interior, but must provide substantially no resistance to the flow of air into the burner.

Referring now especially to FIGURE 4, the inlet to the combustion air passage in burner casting 44 is a trapezoidally shaped opening 122. Filter 60, through which the combustion air must pass before it enters opening 122, comprises a tube assembly 124 and a screen assembly 126.

Incorporated in tube assembly 124 is a plate 128 which covers air inlet 122. Plate 128 is attached to burner casting 44 by a screw 130 which extends through an aperture 132 in plate 128 into a drilled and tapped aperture 134 in the burner casting and by spud 58 which extends through an apertured flange 135 depending from plate 128. A gasket 136 is interposed between plate 128 and burner casting 44 to provide an airtight seal. Fixed to plate 128 as by welding or brazing is a vertical cylindrical tube 138 which communicates with a centrally located aperture 140 in plate 128.

Figure 2:
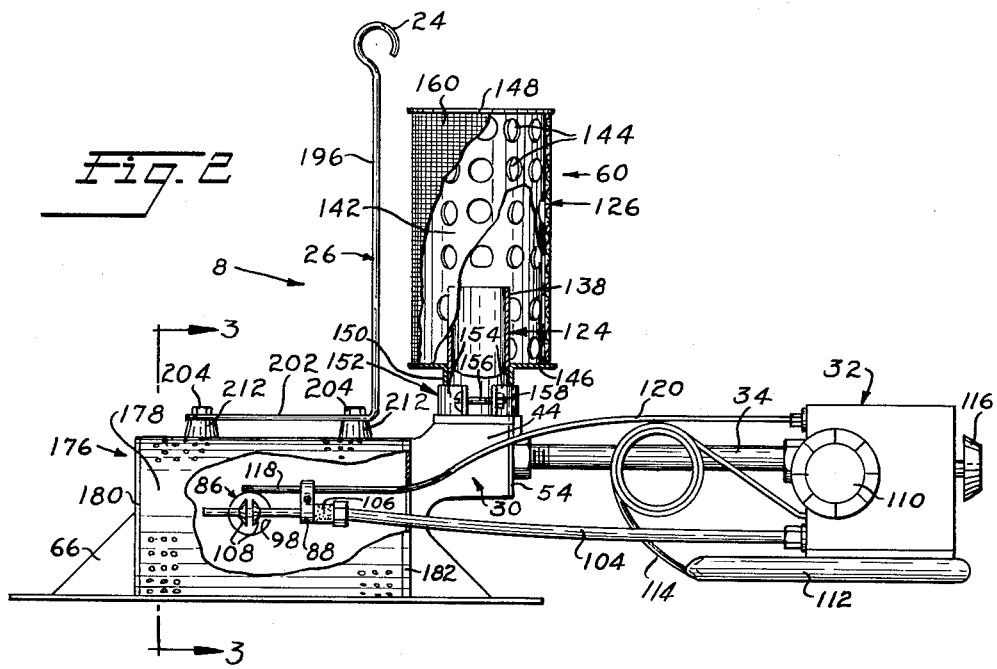
FIGURE 2 is a side elevation of the radiant heater.

Referring now to FIGURES 2 and 3, screen unit 126 surrounds vertical tube 138 and rests on plate 128. Screen unit 126 includes a cylindrical shell 142 of substantially larger diameter than vertical tube 138 which is pierced by large holes 144 sized to provide virtually no resistance to air flow. Tube 138 extends upwardly about two inches into shell 142 and projects about one inch below the shell.

Fixed to the upper and lower ends of shell 142 are imperforate end caps or discs 146 and 148 which are fixed to the shell as by brazing. Formed in lower end cap 146 is a depending cylinder 150 slightly larger in diameter than tube 138. Surrounding cylinder 150 is a conventional hose clamp 152 which includes a strap 154, a screw 156 extending through the ends of strap 154, and a nut 158 threaded on the screw. When filter 60 is assembled cylinder 150 surrounds tube 138 and hose clamp 152 is tightened, fixing screen assembly 126 to tube assembly 124. Three vertical slots 159 (one of which is shown in FIGURE 3) formed at equal intervals around the periphery of cylinder 150 divide the cylinder into segments which collapse against tube 138, providing a tight frictional fit.

Shell 142 supports a fine mesh screen 160 which is wrapped around the shell and fastened by a catch 162. In the illustrated embodiment, screen 160 is fabricated from 0.015 inch diameter wire and is of 30–30 mesh. Catch 162 may be of any desired construction. As shown in FIGURE 4, it includes a male locking member 164 formed in a strap 166 spot welded to screen 160 and a female locking member 168 connected by springs 170 and 172 to a strap 174 also spot welded to the screen. The catch permits screen 160 to be readily removed for cleaning.

In the illustrated embodiment of filter 60, the apertures 144 in shell 142 are 0.88 inch in diameter and are disposed in five rows with eleven apertures in a row. Vertical tube 138 is 2.00 inches in diameter and 3.00 inches long. The 30–30 mesh filter screen 160 is 4.25 inches in diameter and 5.25 inches long.

The combination of tube 138 and screen 160, especially with the dimensions set forth above, is very effective in preventing foreign matter from penetrating to the interior of the burner. The fine mesh screen filters out all but the smallest particles. It has been found that, as the air passes through screen 160 and into tube 138, virtually all of the remaining particles drop out of the air stream and are deposited on lower end cap 146.

As was pointed out above, one of the problems heretofore encountered in employing infrared heaters in brooder houses and like structures has been the tendency for natural drafts and circulating ventilating air to extinguish the pilot flame of the heater. When a safety pilot control is employed, extinguishment of the pilot flame closes the safety valve, causing both the pilot and main burners to go out. If this should happen during cold weather while the brooder house was unattended, the interior temperature might well become so low that the chicks would die. Thus, in brooder houses and similar structures, it is of the utmost importance that extinguishment of the pilot flame be prevented. In the present invention, the novel pilot burner screen assembly 176 is provided for this purpose.

Pilot burner screen assembly 176, which surrounds and is preferably well spaced from pilot burner 86, includes a screen of perforated metal 178 attached, as by welding or brazing, to two generally semicircular imperforate end members 180 and 182. End members 180 and 182 have flat lower edges 184 providing a tight matching fit with the reflector strip 68 on which screen assembly 176 is detachably mounted in surrounding relationship to pilot burner 86 by a spring-type fastener 186.

Fastener 186 consists generally of a coil spring 188 having a hook 190 formed on its lower end which extends through an aperture 192 in screen 178. After the screen assembly 176 is positioned on reflector strip 68, the spring 188 is compressed, lowering hook 190. The catch is then rotated and released, engaging hook 190 around pilot burner 86. A slot 194, formed in imperforate end member 182, accommodate the coaxial cable 120 leading from thermocouple 118 and the pilot burner gas supply line 104.

The size of the apertures in screen 178 is not critical. It is however, essential that they be small enough to substantially prevent the passage of particulate material floating in the air but, at the same time, large enough to afford substantially no impediment to the flow of air to the pilot burner.

Turning now to FIGURE 4 of the drawing, the hanger 26 by which infrared heater 8 is suspended has an L-shaped configuration with loop 24 at the upper end of one leg 196 and a pair of cross members 198 and 200 fixed to the second horizontally extending leg 202 as by welding.

Hanger 26 is fixed to burner casting 44 by four screws 204 which extend through washers 206 and loops 208 formed at the ends of cross members 198 and 200 into drilled and tapped apertures 210 in four bosses 212 formed in the upper wall of the burner casting. Hanger 26 is so positioned with respect to the center of gravity of heater 8 that, when the heater is suspended in the preferred manner (see FIGURE 1), the ceramic block 50 of burner 30 adjacent which the combustible mixture burns will be slightly inclined from the horizontal with the control unit 32 and the combustion air inlet opening 122 at the lower end. This manner of suspending heater 8 is an important feature of the present invention and provides the following advantages:

A. The products of combustion generated by burner 30 will readily flow over the elevated edge of ceramic plate 50 from which point they may rise and escape through vents (not shown) provided in the upper reaches of brooder house 10.

B. The hot combustion products are prevented from flowing towards control unit 32 and thereby adversely effecting the accuracy of temperature sensing element 112.

C. Products of combustion are directed away from the combustion air inlet opening 122 preventing the combustion products from mixing with the combustion air and adversely effecting the combustion process in the burner; and D. Temperature sensing element 112 is positioned so that it will be effected only by heat radiated from the brooder house floor 14 and from the bodies of the chicks on it together with warm air circulating in brooder house 10.

The deleterious effect of heating control unit temperature sensing element 112 by heat radiated from burner 30 is further reduced by the separation of control unit 32 and burner 30 afforded by gas supply pipe 34. At the same time supply pipe 34 unites those components in a rigid unitary structure for ease in handling.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In an infrared heater for brooder houses and the like:
    (a) an apertured member providing a radiant surface;
    (b) a burner housing providing a plenum chamber on one side of said member;
    (c) means for supplying a combustible mixture to said plenum chamber and through said apertured member to the opposite side thereof;
    (d) a reflector surrounding said apertured member and having an interior side exposed to said apertured member;
    (e) means fixing said reflector to said burner housing;
    (f) a pilot burner;
    (g) means fixing said pilot burner on the exterior side of said reflector;
    (h) an opening formed at least in part by said reflector;
    (i) means for supplying gas to said pilot burner and being ignitable to produce a pilot flame, said pilot burner being so positioned with respect to said opening that said pilot flame is directed therethrough to ignite the combustible mixture passing through said apertured member;
    (j) a shield mounted in surrounding relation to said pilot burner for preventing extinguishment of said pilot flame, said shield providing at least one opening to admit air into the region of said pilot burner; and
    (k) means detachably fixing said shield to said reflector.

2. The infrared heater defined in claim 1 wherein:
    (a) said means fixing said pilot burner on the exterior side of said reflector comprises a bracket, and wherein:
    (b) said means supplying said combustible mixture to said plenum chamber comprises:
        (1) means providing a supply of fuel gas to said plenum chamber, and
        (2) control means responsive to said pilot flame for controlling said supply of fuel gas to said plenum chamber, said control means including a temperature sensing element mounted by said bracket adjacent to said pilot burner.

3. The infrared heater defined in claim 1 wherein:
    (a) said means supplying said combustible mixture to said plenum chamber comprises an air inlet for furnishing combustion air to said plenum chamber; and wherein
    (b) means are provided for filtering air entering said air inlet comprising:
        (1) a screen surrounding said air inlet, and
        (2) means detachably supporting said screen on said burner housing.

4. The infrared heater defined in claim 1 wherein said shield comprises a screen.

5. The infrared heater defined in claim 1 comprising:
    (a) a screen of heat resistant material, and
    (b) means supporting said screen from said burner housing in spaced apart substantially parallel relation to said radiant surface on said opposite side of said apertured member for protecting the flame produced by ignition of said combustible mixture from disturbance by air currents.

6. In combination with a brooder house or like structure:
    (a) an apertured member providing a radiant surface facing the floor of said structure;
    (b) a burner housing providing a plenum chamber on the upper side of said apertured member;
    (c) means supporting said apertured member from said housing;
    (d) means for supplying a combustible mixture to said plenum chamber for flow through said apertured member and including a rigid pipe fixed to and supported from said housing at one end thereof and extending rearwardly therefrom along a predetermined longitudinal axis;
    (e) means providing an air inlet for introducing air for combustion into said plenum chamber, said air inlet being disposed adjacent said pipe at said one end of said housing;
    (f) a thermostatic control unit including a temperature responsive element, a casing, and valve means disposed in said casing and being under the control of said temperature responsive element for controlling the supply of gas to said pipe;

(g) means supporting said casing from said pipe in spaced relationship to said burner housing;

(h) means mounting said temperature responsive element rearwardly of said one of said housing and substantially adjacent said casing;

(i) a fixed overhead support secured to said structure; and (j) flexible means suspending said housing together with the parts supported thereby from said overhead support, said flexible means being fixed to said burner housing at least at one point so related to the centers of gravity of said housing, said apertured member, said pipe, and said control unit as to orient said apertured member at an acute angle with respect to the floor of said structure, whereby the end of said apertured member opposite from said one end of said burner housing is at the highest elevation to direct combustion products in a direction away from said thermostatic control element and said air inlet.

7. The combination defined in claim 6 comprising means for selectively adjusting the height of said burner housing from the floor of said structure.

References Cited in the file of this patent

UNITED STATES PATENTS

| | | |
|---|---|---|
| 406,584 | Jacob | July 9, 1889 |
| 1,395,431 | Kresky | Nov. 1, 1921 |
| 1,518,007 | Sheer | Dec. 2, 1924 |
| 1,841,463 | Barber et al. | Jan. 19, 1932 |
| 2,240,571 | Olson et al. | May 6, 1941 |
| 2,378,839 | Ensign et al. | June 19, 1945 |
| 2,439,038 | Cartter | Apr. 6, 1948 |
| 2,531,139 | Lilly et al. | Nov. 21, 1950 |
| 2,577,772 | Kennedy | Dec. 11, 1951 |
| 2,610,285 | Rusnak et al. | Sept. 9, 1952 |
| 2,936,751 | Forniti | May 17, 1960 |
| 2,985,137 | Horne | May 23, 1961 |
| 3,107,720 | Van Swinderen | Oct. 22, 1963 |

FOREIGN PATENTS

| | | |
|---|---|---|
| 777,618 | Great Britain | June 26, 1957 |
| 784,419 | Great Britain | Oct. 9, 957 |
| 842,596 | Great Britain | July 27, 1960 |
| 845,525 | Great Britain | Aug. 24, 1960 |

OTHER REFERENCES

Article by Miller, in Air Conditioning and Ventilating of March 1960.

UNITED STATES PATENT OFFICE

CERTIFICATE OF CORRECTION

Patent No. 3,139,881                                         July 7, 1964

John J. Fannon, Jr.

It is hereby certified that error appears in the above numbered patent requiring correction and that the said Letters Patent should read as corrected below.

Column 9, line 6, after "one" insert -- end --.

Signed and sealed this 19th day of January 1965.

(SEAL)
Attest:

ERNEST W. SWIDER                              EDWARD J. BRENNER
Attesting Officer                                     Commissioner of Patents